(12) United States Patent
Hendriks et al.

(10) Patent No.: US 7,126,900 B2
(45) Date of Patent: Oct. 24, 2006

(54) OPTICAL SCANNING DEVICE

(75) Inventors: Bernardus Hendrikus Wilhelmus Hendriks, Eindhoven (NL); Jorrit Ernst De Vries, Eindhoven (NL)

(73) Assignee: Koninklijke Philips Electronics N. V., Eindhoven (NL)

( * ) Notice: Subject to any disclaimer, the term of this patent is extended or adjusted under 35 U.S.C. 154(b) by 182 days.

(21) Appl. No.: 10/497,343

(22) PCT Filed: Dec. 5, 2002

(86) PCT No.: PCT/IB02/05181

§ 371 (c)(1),
(2), (4) Date: Jun. 1, 2004

(87) PCT Pub. No.: WO03/049089

PCT Pub. Date: Jun. 12, 2003

(65) Prior Publication Data

US 2004/0264017 A1    Dec. 30, 2004

(30) Foreign Application Priority Data

Dec. 6, 2001    (EP) ................................. 01204725

(51) Int. Cl.
*G11B 7/00* (2006.01)

(52) U.S. Cl. .............................. 369/112.01; 369/110.02
(58) Field of Classification Search ............. 369/44.23, 369/44.24, 112.16, 112.19, 110.01, 110.02, 369/110.03, 110.04, 112.01
See application file for complete search history.

(56) References Cited

U.S. PATENT DOCUMENTS

| 5,095,476 A | * | 3/1992 | Greve et al. ........... 369/110.02 |
| 6,215,756 B1 | | 4/2001 | Shimano et al. |
| 6,567,365 B1 | | 5/2003 | Hendriks et al. |

FOREIGN PATENT DOCUMENTS

| EP | 0865037 A1 | 9/1998 | |
| JP | 07-065407 | * 3/1995 | ............ 369/112.19 |
| JP | 2000-163791 | 6/2000 | |
| WO | WO 01/24174 A1 | 4/2001 | |

* cited by examiner

*Primary Examiner*—Nabil Hindi (57) ABSTRACT

An optical scanning device for scanning a dual-layer optical record carrier. The device includes a spherical aberration compensation optical subsystem having a switchable liquid crystal cell (10) for altering a wavefront deviation generated in a folding mirror (32) including a non-periodic phase structure (NPS) located behind a polarization-selective reflective layer.

17 Claims, 6 Drawing Sheets

OPTICAL SCANNING DEVICE

BACKGROUND OF THE INVENTION

1. Field of the Invention

This invention relates to an optical scanning device, and an optical element for use therein, for scanning an optical record carrier, such as an optical disk, comprising an information layer, the device comprising a radiation source for generating a radiation beam and an objective lens, located in an optical path between the radiation source and the information layer, for converging the radiation beam to a spot on the information layer. In particular, but not exclusively, the invention relates to an optical scanning device including an optical element to compensate for spherical aberrations generated by different optical path lengths (referred to herein as information layer depths) through which the beam travels in an optical disk to reach an information layer in the disk.

2. Description of the Related Art

There is a need for the production of optical record carriers of high capacity. Therefore, optical scanning devices using a relatively short wavelength radiation beam, for example, a radiation beam of 400 nm, and a high numerical aperture (NA) objective lens system, at least 0.7 and, for example, NA=0.85, are desirable. Furthermore, the capacity can be increased by providing a dual layer disk. At the wavelength and NA mentioned, a layer separation of at least 20–30 μm is desirable in order to reduce the coherent cross talk to an acceptable level. Without compensating measures, refocusing from one layer to the other results in spherical aberration, generating a wavefront error of 200–300 mλ root mean square optical path difference (OPD (rms)), which deteriorates the resolution of the optical spot formed.

It is known to mechanically adjust the spacing of the two, or more, lens elements of a compound objective lens, in order to provide spherical aberration compensation. Another method of compensation is by mechanically adjusting the position of a collimator lens with respect to the radiation source, so that the radiation beam impinges on the objective lens as a convergent, or divergent, instead of collimated, beam. Each of these methods compensates spherical aberration generated in the optical system of the scanning device, to at least approximately cancel out that generated in the optical disk being scanned.

However, using mechanical actuators to provide spherical aberration compensation, particularly when a separate mechanical actuator is used to provide focus control, is relatively complex and, therefore, increases the cost of manufacture of the scanning device.

A further known optical scanning device is described in International Patent Application No. WO-A-01/24174, corresponding to U.S. Pat. No. 6,567,365, in which a radiation beam is passed through a twisted nematic (TN) liquid crystal cell which selectively rotates the polarization of incident light by 90°. The beam is then passed, when in a convergent state, through a birefringent plate to produce spherical aberration therein. The birefringent plate produces different amounts of spherical aberration depending on the state of the TN cell, to compensate for the different information layer thicknesses.

European Patent Application No. EP-A-0865037 A1, corresponding to U.S. Pat. No. 6,215,756, and an article in Applied Optics, volume 38 (1999) pp 3778–3786 by R. Katayama, describe a phase structure which is used to make an objective lens designed for scanning DVD record carriers also suitable for scanning CD record carriers. In general, DVD record carriers are designed for being scanned with a radiation beam of a wavelength and numerical aperture different from that used for scanning a previous generation of record carriers, such as CD. The phase structure consists of stepped non-periodic annular zones, such that each zone gives rise to a phase step which is equal to a multiple of $2\pi$ for the DVD wavelength (660 nm), so that the phase structure has no effect at this wavelength. For CD read out, however, a different wavelength is used (785 nm). Consequently, the stepped phase profile results now in phase steps which no longer are equal to a multiple of $2\pi$. With a proper design of the steps heights and zone width, the phase introduced by the phase structure in the CD case reduces the wavefront aberration caused by the information layer depth difference to below the diffraction limit. The structure is capable of reducing the wavefront aberration for two discrete wavelengths.

Japanese Patent Publication No. JP-A-2000-163791 describes a diffraction grating for an optical head for an optical scanning device capable of operating at two different wavelengths. Two different radiation sources are used and a grating is located behind a dichroic reflector forming a folding mirror for directing the radiation towards an objective system. The diffraction grating is a periodic structure, i.e., one which regularly repeats across the element. For one wavelength, the dichroic reflector reflects the radiation beam without diffraction, while for the other wavelength, the dichroic reflector transmits the radiation beam and the grating diffracts the radiation. In this way, while the optical axes of the beams emanating from the two radiation sources do not initially coincide, the beams pass coaxially through the objective system. Due to the diffraction, a certain amount of the input light is wasted, which is undesirable.

SUMMARY OF THE INVENTION

It is an object of the invention to provide an improved wavefront aberration compensation system in an optical scanning device.

In accordance with one aspect of the invention, there is provided an optical element for use with a first radiation beam and a second radiation beam, the optical element including:

a first reflective surface, said first surface being selectively reflective and capable of reflecting said first radiation beam and of transmitting said second radiation beam; and a second reflective surface arranged to receive said second radiation beam when transmitted by said first surface, and to reflect said second radiation beam through said first surface, wherein said second surface is separated from said first surface by a varying spacing, said varying spacing corresponding to a difference in phase profile to be generated between said first and second beams, and said second surface comprises a phase structure in the form of stepped annular zones, the zones forming a non-periodic pattern of different heights corresponding to the difference in phase profile to be generated.

Wavefront aberration compensation may be provided for information layers at various depths within an optical disk, or between optical disks, even in a relatively high numerical aperture device, without the need for a mechanical system to provide such wavefront aberration compensation.

The second surface preferably has a pattern of stepped annular zones which is non-periodic, i.e., one which does not regularly repeat in the radial direction, and, therefore, does not form diffraction orders. As a consequence, the phase structure does not have the inherent losses of a grating. The optical element introduces the required wavefront changes with less loss of radiation energy. Arranging the step-like structure with plane-parallel reflective surfaces, has an advantage in that astigmatism can be reduced.

In an alternative embodiment, a continuously varying reflective lensing surface is used instead of a step-like structure. However, such a lensing surface will, in general, give rise to astigmatism wavefront aberration, because rays do not travel parallel to the optical axis.

BRIEF DESCRIPTION OF THE DRAWINGS

Features and advantages of various embodiments of the invention will become apparent from the following description, given by way of example only, of preferred embodiments of the invention, which refers to the accompanying drawings, wherein.

DESCRIPTION OF THE PREFERRED EMBODIMENTS

Figures 1, 1A:
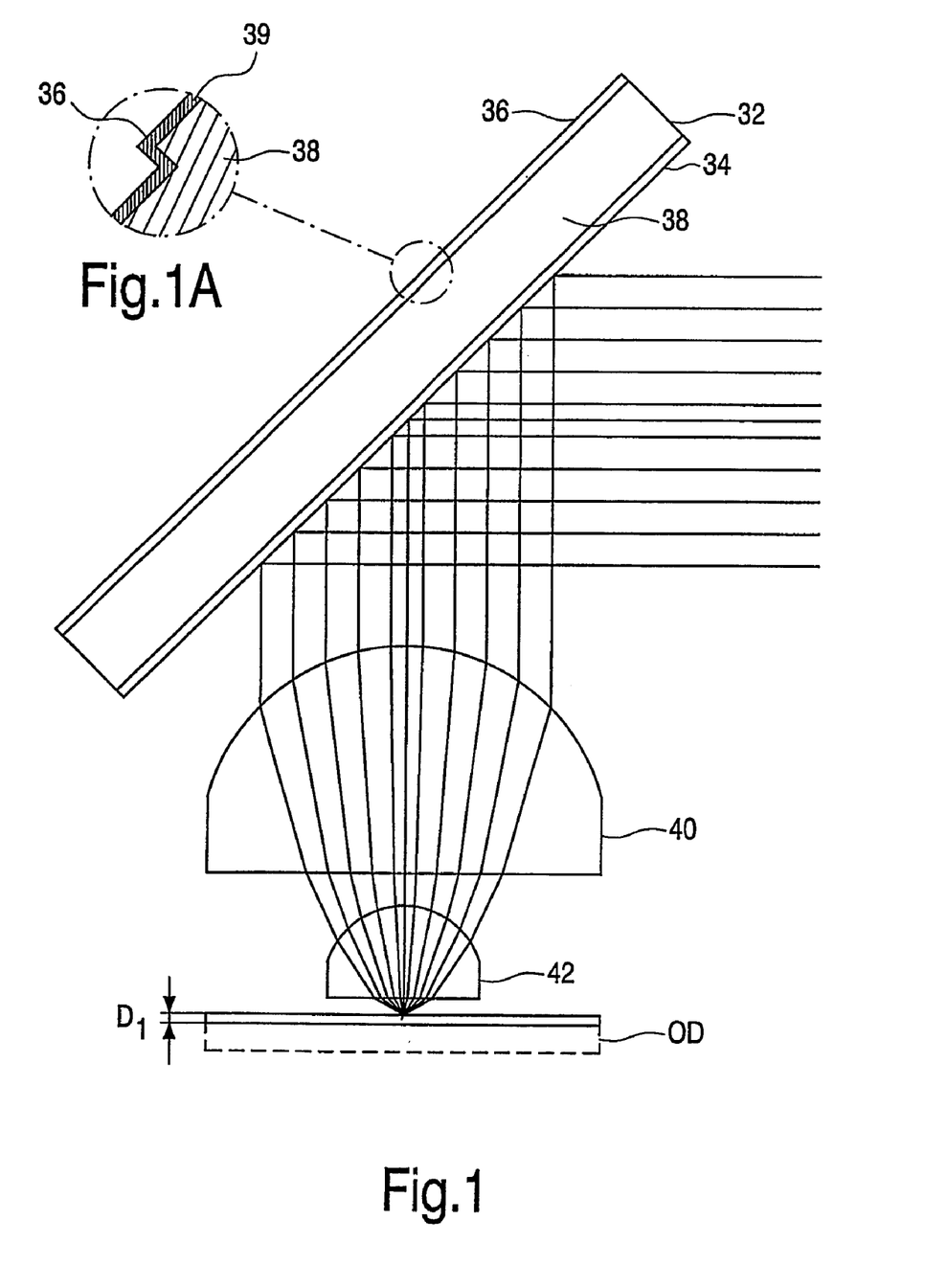
FIGS. 1, 1A and 2 are schematic illustrations of optical components used in an embodiment of the invention.

FIG. 1 illustrates a phase modifying folding mirror 32 arranged in an optical scanning device in accordance with one embodiment of the invention. The folding mirror 32 includes a first reflective surface 34 formed from a thin-film laminar structure, similar to that used in polarizing beam splitters, having polarizing characteristics. The first surface 34 reflects radiation impinging upon it at a 45° angle with a first polarization, and transmits radiation impinging upon it from the same angle with a second, orthogonal polarization.

A second reflective surface 36 is arranged to the opposite side of the folding mirror 32. As shown in FIG. 1A, the second reflective surface is coated in a mirroring material, for example, a thin metallic film, 39, and the surface 36 includes a non-planar phase structure in the form of stepped annular zones, the zones forming a non-periodic pattern of different heights corresponding to a wavefront aberration to be generated when radiation of the second polarization is incident upon the phase modifying mirror 32.

An optically isotropic substrate material 38, for example, a machined glass plate or molded plastics plate, separates the first and second surfaces 34, 36. Due to the non-periodic phase structure (NPS) present on the second surface 36, the spacing between the first and second surfaces 34, 36, occupied by the substrate 38, varies corresponding to the difference in phase profile to be generated in two passes through the substrate 38 of the folding mirror 32.

As shown in FIG. 1, the folding mirror 32 is used, in this embodiment, in an optical scanning device for scanning an optical disk OD using a relatively short wavelength radiation beam, for example, a radiation beam of 400 nm (±10 nm) and a relatively high numerical aperture (NA) objective lens system, for example, NA=0.85. The objective lens system in this case is a compound objective lens consisting of a first lens element 40, for converting the beam to a first convergent state from a collimated state, and a second lens element 42, for converging the beam from the first convergent state to a second, more convergent, state.

In the arrangement shown in FIG. 1, the beam incident upon the phase modifying mirror 32 consists primarily of linearly polarized radiation having the first-mentioned polarization, such that the incident, collimated beam is reflected from the first surface 34. Since the first surface 34 is planar, the wavefront is not modified. The compound objective lens 40, 42 is optimized for the reading of an information layer within the optical disk having an information layer depth $D_1$, producing a diffraction-limited spot on the information layer as desired. In this example, $D_1$ is 100 μm (±30 μm).

Figure 2:
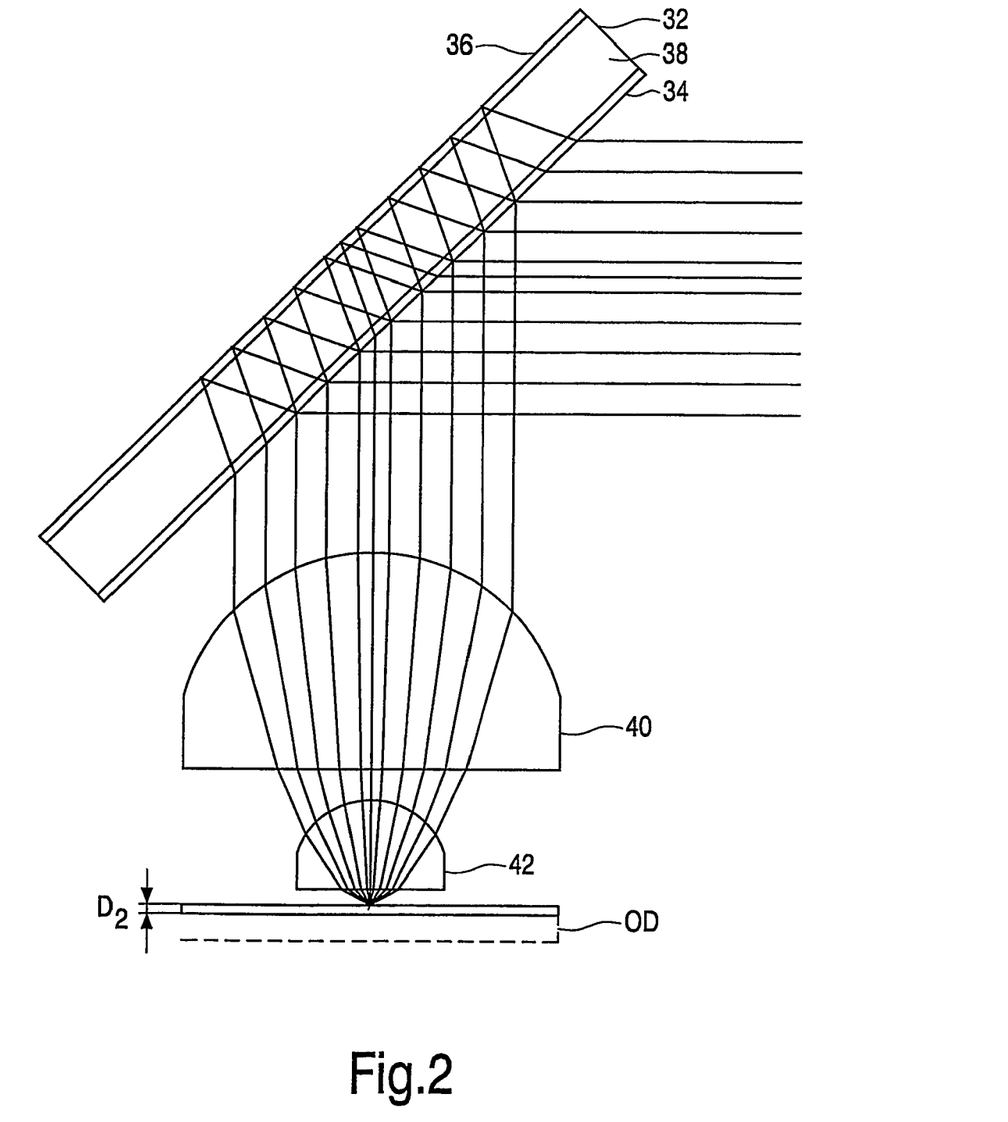

Referring now to FIG. 2, the same arrangement shown in FIG. 1 is utilized in order to read an information layer having an information layer depth of $D_2$ in the optical disk. $D_2$ is less than $D_1$, in this example, 80 μm (±30 μm). In this case, a collimated, linearly polarized radiation beam consisting primarily of the second above-mentioned polarization state is incident upon the phase modifying mirror 32. The beam, in this case, is transmitted through the first reflective surface 34, travels through substrate layer 38, is reflected from the second reflective surface 36 and travels once more through the substrate layer 38 and the first reflective surface 34 towards the first lens element 40. Since the second reflective surface 36 is arranged generally plane-parallel to the first reflective surface 34, the beam remains in a collimated state; however, the NPS on the second surface 36 provides a wavefront deviation approximating the spherical aberration introduced due to the layer separation $(D_1-D_2$, in this example, 20 μm (±10 μm)), thereby again allowing for a diffraction-limited spot to be produced on the information layer being scanned.

Figure 3:
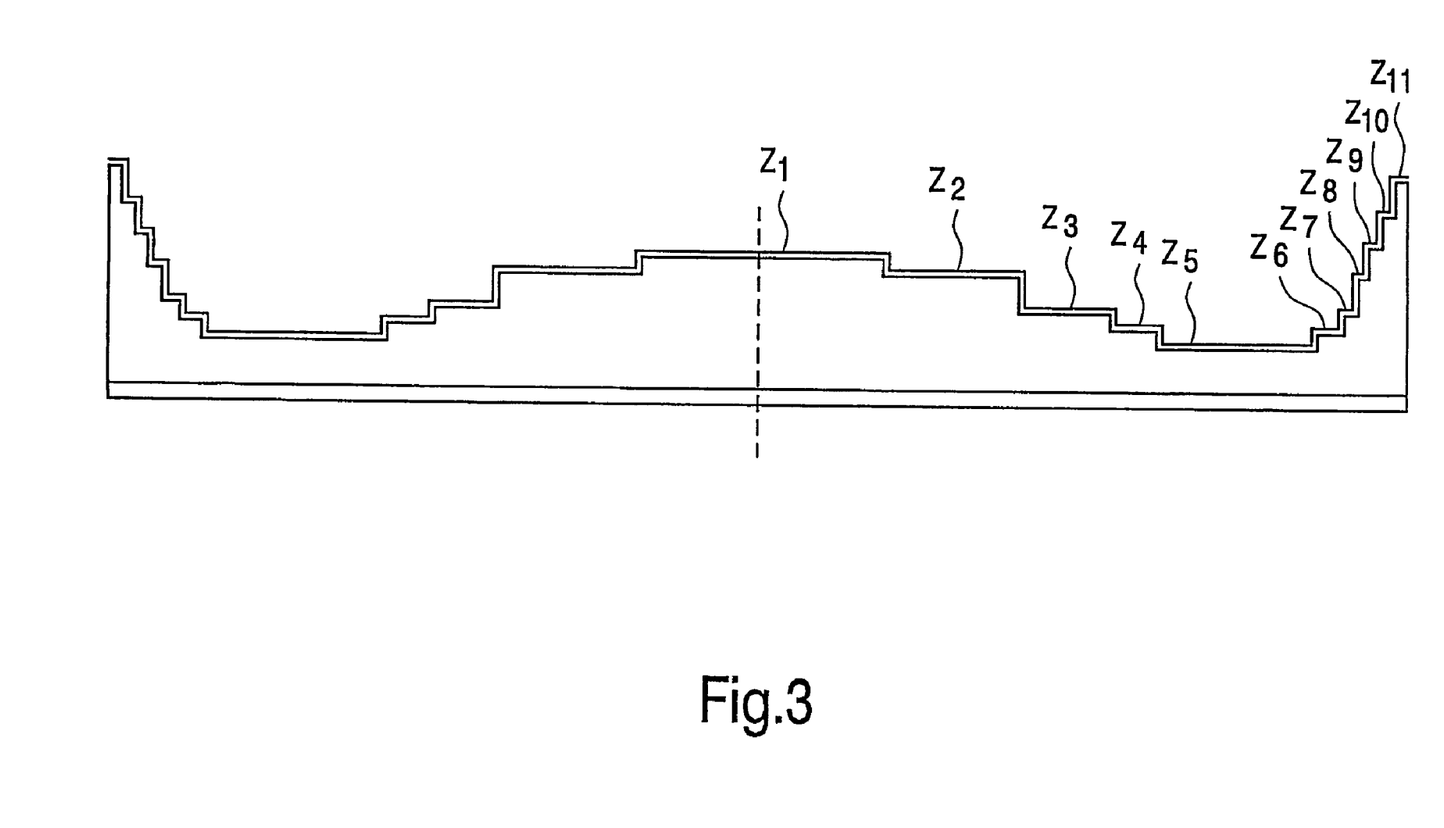
FIG. 3 is a cross-sectional view of an optical element in accordance with an embodiment of the invention.

As mentioned above, the NPS is in the form of annular stepped zones. FIG. 3 schematically illustrates the phase modifying mirror 32 with stepped zones $Z_1-Z_{11}$ of the NPS shown in cross-section in greater detail. For the sake of illustration, the height variations between the zones are illustrated out of scale; in practice, the height variations will be much smaller in relation to the width of the phase modifying mirror 32. The height variations of the zones are arranged in accordance with the phase structure set out in Table 1 below, so as to be capable of generating a wavefront deviation corresponding approximately to a spherical aberration introduced by the information layer depth differences. Note that although 11 zones are used in this example, other numbers of zones may be used. Preferably, the number of zones is between 5 and 25, to provide sufficient wavefront correction efficiency while maintaining a relatively small number of zones, for manufacturing efficiency.

TABLE 1

| Zone | $r_{begin}$ zone [mm] | $r_{end}$ zone [mm] | Φ [radians] |
|------|------------------------|----------------------|-------------|
| Z1   | 0.00                   | 0.30                 | 0.000       |
| Z2   | 0.30                   | 0.50                 | −0.4822     |
| Z3   | 0.50                   | 0.68                 | −1.2497     |
| Z4   | 0.68                   | 0.85                 | −2.0739     |
| Z5   | 0.85                   | 1.20                 | −2.5988     |
| Z6   | 1.20                   | 1.28                 | −2.0367     |
| Z7   | 1.28                   | 1.34                 | −1.3963     |
| Z8   | 1.34                   | 1.38                 | −0.5842     |
| Z9   | 1.38                   | 1.43                 | 0.3337      |
| Z10  | 1.43                   | 1.47                 | 1.6431      |
| Z11  | 1.47                   | 1.50                 | 2.9497      |

Figure 4A:
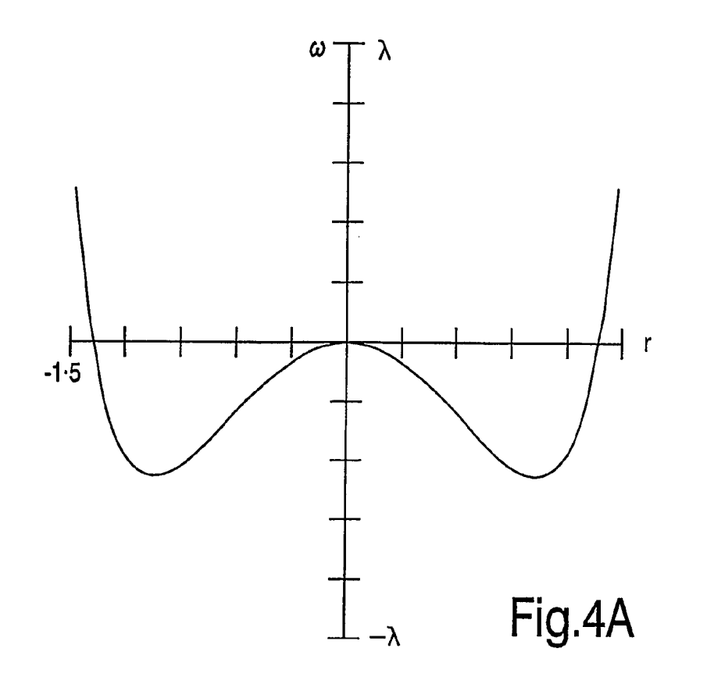
FIGS. 4A and 4B show wavefront aberrations before and after compensation.
Figure 4B:
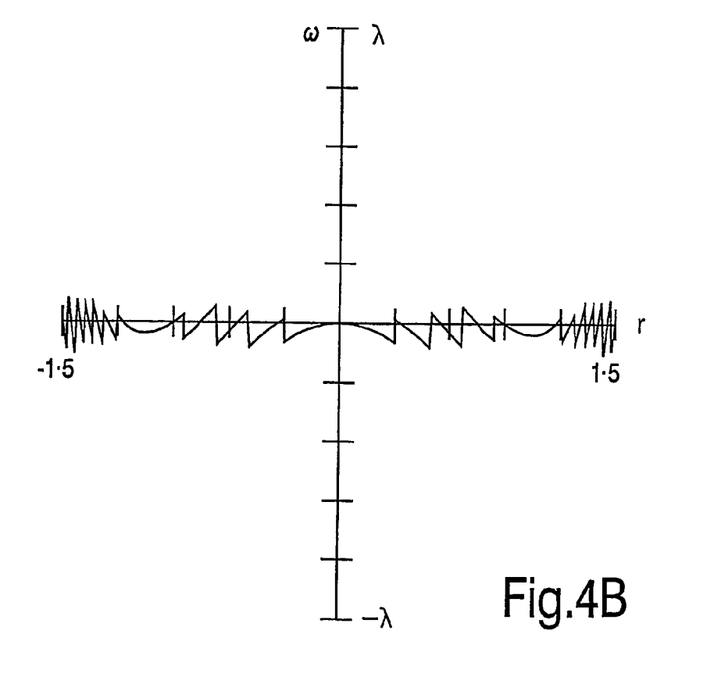

FIG. 4A illustrates a spherical aberration due to the information layer differences, in terms of wavefront error optical path difference (W) to be compensated across the width of the beam. The root mean square of the optical path difference (OPD (rms)) of this wavefront error is 230 m$\lambda$. FIG. 4B illustrates the residual wavefront error after compensation by use of the phase modifying mirror 32. Note that the OPD (rms) of this wavefront error is 34 m$\lambda$, well below the diffraction limit, thereby allowing both layers to be successfully scanned. The diffraction limit we define as 70 m$\lambda$, at which point the site of the spot due to wavefront error is taken to exceed that due to diffraction alone.

Note, when comparing FIGS. 3 and 4A, that the shape of the NPS in cross-section corresponds, generally, with the shape of the spherical aberration wavefront error. While in this embodiment, the phase structure formed on the second surface 36 is in the form of a stepped annular NPS, in an alternative embodiment, the phase structure takes the form of a non-planar generally continuous surface having a shape corresponding to the wavefront error to be compensated; in this case, the shape of the surface is similar to the wavefront error curve illustrated in FIG. 4A, however, shallower, i.e., the height variations and gradients involved are not as large.

Each zone of the NPS illustrated in FIG. 3 consists of an elliptical annular plane-parallel surface, other than the innermost zone $Z_1$, which consists of an elliptical plane-parallel disk. Each of the zones is separated from the adjacent zones by a vertical step, the step heights having no geometric relationship between each other. An arrangement in which the step heights are equal, or multiples of one another, would be possible, however it is not preferred, since such restriction tends to reduce the amount of wavefront error correction possible with a given number of zones.

As mentioned, the annular zones are elliptical in shape; this is because the beam impinges upon the phase modifying mirror 32 at an angle of 45°. The annular zones, when projected onto a plane surface angled at 45° to the element, form substantially circularly symmetric annular zones. Furthermore, the annular zones are arranged generally concentrically with the optical axis of the radiation beam, and that of the objective lens. Hence, the phase modifying mirror 32 is capable of correcting symmetric wavefront aberrations in the radiation beam before spot formation on the information layer being scanned.

Figure 5:
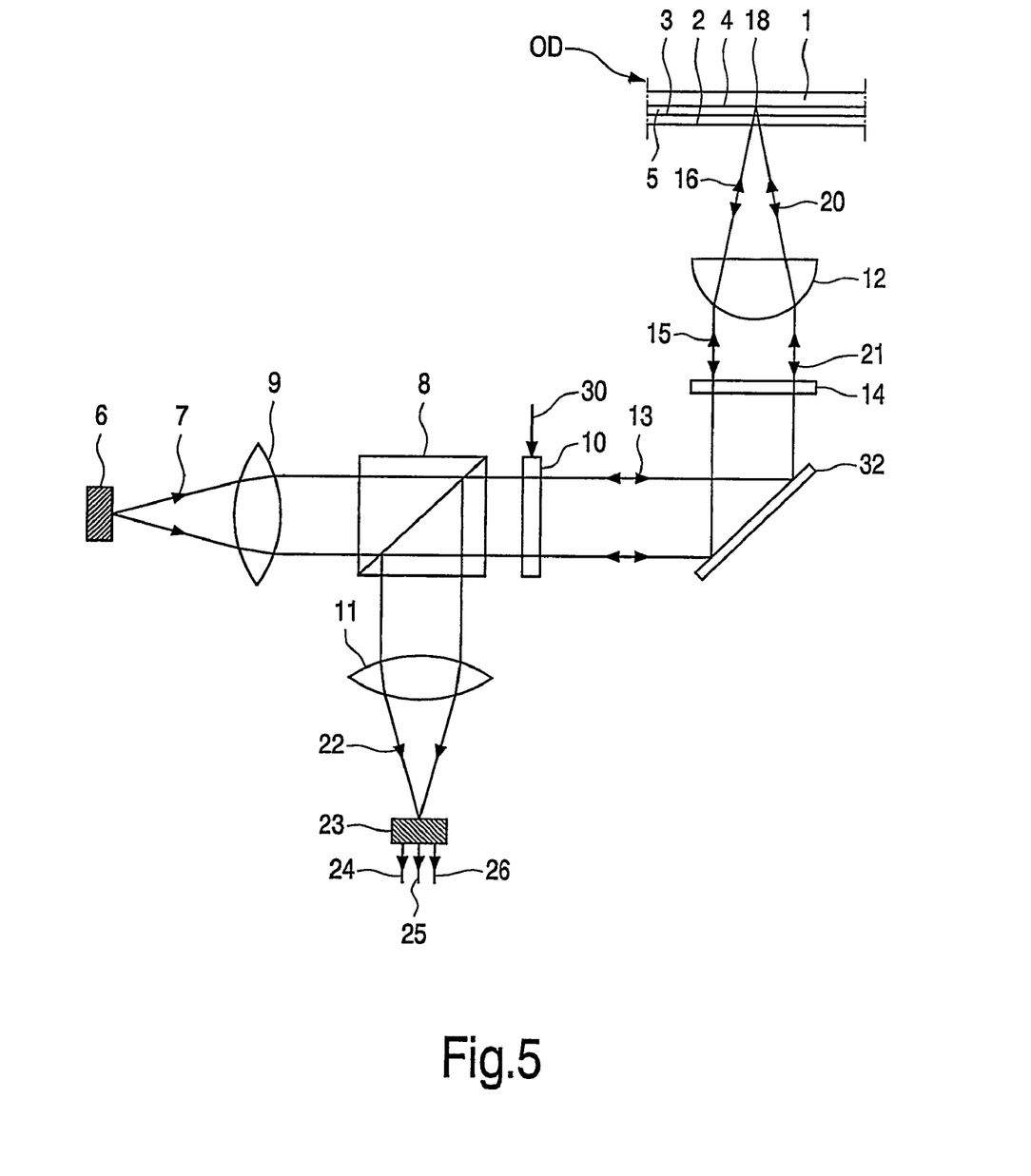
FIG. 5 is a schematic illustration of an optical scanning device arranged in accordance with embodiments of the invention.

FIG. 5 is a schematic illustration of components common to a device, in accordance with the invention, for scanning a dual-layer optical disk OD. The optical disk OD comprises a substrate 1 and a transparent layer 2, between which at least one information layer 3 is arranged. In the case of a dual-layer optical disk, as illustrated, two information layers 3, 4 are arranged behind the transparent layer 2, at different depths within the disk, separated by 20 $\mu$m (±10 $\mu$m). A further transparent layer 5 separates the two information layers. The transparent layer 2, having a thickness of approximate 80 $\mu$m (±30 $\mu$m), has the function of protecting the uppermost information layer 3, while the mechanical support is provided by the substrate 1.

Information may be stored in the information layers 3, 4 of the optical disk in the form of optically detectable marks arranged in substantially parallel, concentric or spiral tracks, not indicated in FIG. 1. The marks may be in any optically readable form, e.g., in the form of pits, or areas with a reflection coefficient or a direction of magnetization different from their surroundings, or a combination of these forms.

The scanning device includes an optical pickup unit (OPU) mounted on a radially-movable arm. The OPU includes all components illustrated in FIG. 1, other than the disk OD. A radiation source 6, for example, a single semiconductor laser, emits a diverging linearly polarized radiation beam 7 of a wavelength of 400 nm (±10 nm). A beam splitter 8, in this example, a polarizing beam splitter, transmits and reflects the radiation within a lens system in a polarization-dependent manner. The lens system includes a collimator lens 9, an objective lens 12, having an NA of 0.85, and a condenser lens 11. The objective lens 12 is rigidly mounted within mechanical actuators (not shown) for performing radial tracking servo and focus servo adjustment of the position of the objective lens 12.

The collimator lens 9 refracts the diverging radiation beam 7 to form a collimated beam 15 to be transmitted towards a phase modifying folding mirror 32. By collimated, we intend to mean a substantially parallel beam, for which the compound objective lens has a transverse magnification substantially equal to zero. The need for a collimated beam arises when the folding mirror 32, and other optical elements in the collimated beam path are designed for use with an ideally collimated (parallel) beam, as in this embodiment. A collimated beam is, however, not necessary when the elements in the beam path are designed for use with a divergent or convergent beam. Even using elements designed for use with an ideally collimated beam, a certain tolerance as to vergence of the beam is acceptable, depending on the efficiency required of the optical system. To achieve the efficiency desired of the present optical system, the collimated beam preferably has a vergence resulting in an absolute magnification of the objective lens smaller than 0.02.

Before reaching mirror 32, the beam passes through a switchable twisted nematic (TN) liquid crystal cell 10 to form a collimated beam 13 of a desired polarization. After reflection by mirror 32, the beam passes through a quarter wave phase retardation plate for transforming the linearly polarized beam to a circularly polarized beam.

The objective lens 12 transforms the circularly-polarized radiation beam 15 into a converging beam 16 having a high numerical aperture (NA), in this example, 0.85, which comes to a spot 18 on the information layer, 3 or 4, being scanned.

Radiation of the converging beam 16 reflected by the information layer 3 or 4 forms a diverging reflected beam 20, which returns along the optical path of the forward converging beam. The objective lens 12 transforms the reflected beam 20 to a substantially collimated reflected beam 21, and the beam splitter 8 separates the forward and reflected beams by transmitting at least part of the reflected beam 21 towards the condenser lens 11.

The condenser lens 11 transforms the incident beam into a convergent reflected beam 22 focused on detection systems, generally indicated by a single element 23, although a plurality of detector elements are used. The detection systems capture the radiation and convert it into electrical signals. One of these signals is an information signal 24, the value of which represents the information read from the information layer being scanned. Another signal is a focus error signal 25, the value of which represents the axial difference in height between the spot 18 and the respective information layer 3, 4 being scanned. Another signal is a tracking error signal 26, the value of which represents a radial deviation of the spot from the track being scanned. Each of the signals 25, 26 are input to the focus servo and tracking servo mechanical actuators controlling the position of mounting 13 during scanning.

Another signal input into TN cell 10 is a spherical aberration control signal 30. The spherical aberration control signal 30 represents the selected information layer 3 or 4 in the optical disk currently being scanned. The control signal 30 may be derived from detection systems 23 arranged to be capable of detecting spherical aberrations in the return beam.

Figure 6A:
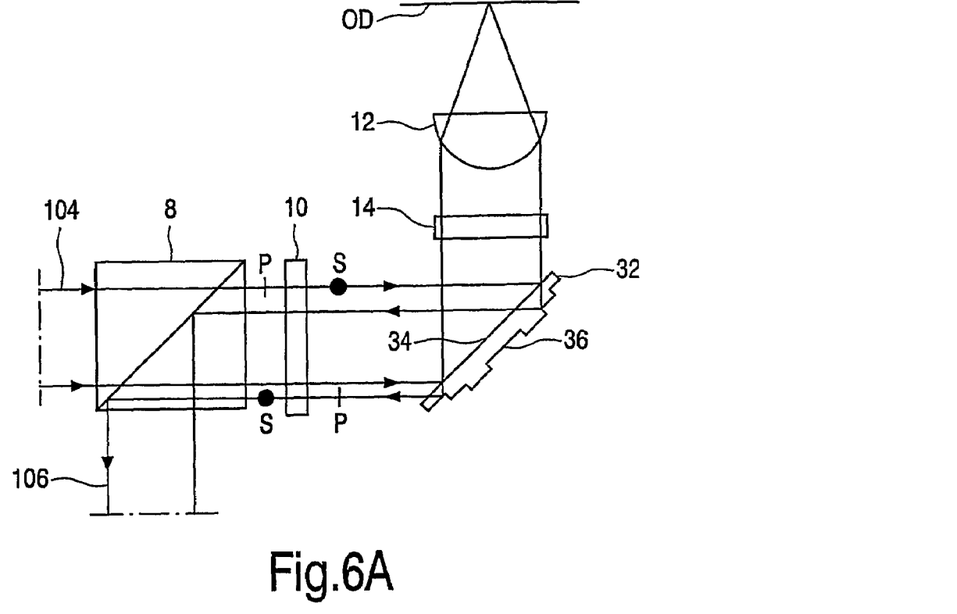
FIG. 6 is a schematic view of the optical path of the arrangement of FIG. 5.
Figure 6B:
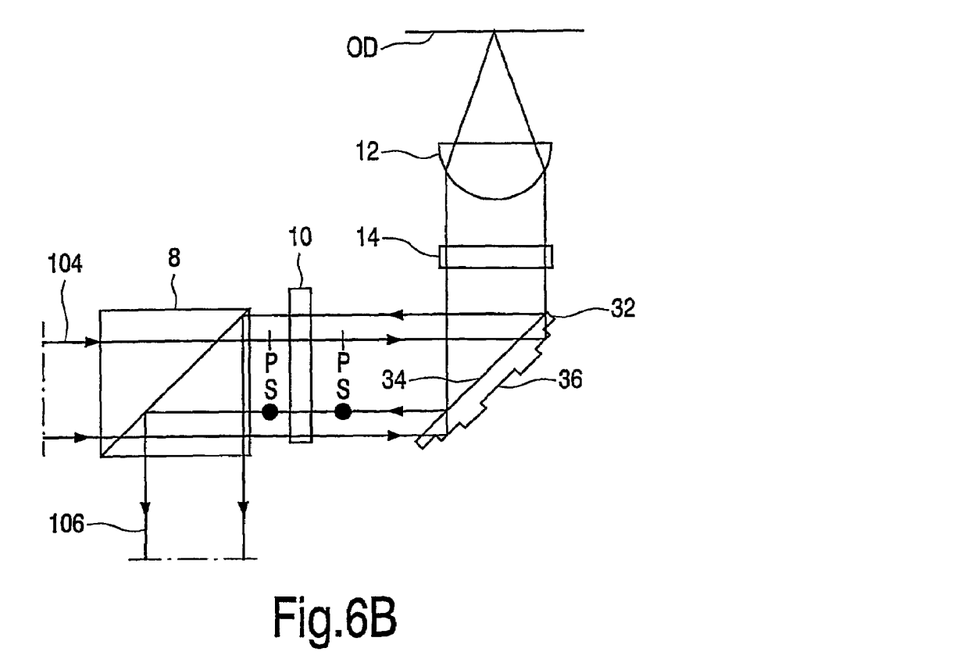

FIGS. 6A and 6B schematically illustrate an embodiment of the invention, including the TN cell 10 and the folding mirror 32 forming a spherical aberration compensation optical subsystem.

The TN cell 10 is a planar cell, consisting of a liquid crystal layer interposed between two transparent planar plates having conductive transparent layers formed on the inner surfaces thereof, forming the electrodes of the TN liquid crystal cell 10. As is known in the art of TN liquid crystal cells, in addition to the electrode layers, the surfaces of the electrodes adjacent the liquid crystal layer are coated with an alignment material. The material at one side of the liquid crystal cell 10 aligns the liquid crystal molecules in an orientation which is perpendicular to the direction of orientation with which the material on the other side of the liquid crystal cell aligns the liquid crystal molecules. Accordingly, a 90° twist is formed in the bulk of the liquid crystal layer, between the two sides of the liquid crystal cell, when the cell 10 is in an off-state. The liquid crystal cell 10 is connected to a voltage source which is controlled by the spherical aberration control signal 30. When switched on, the voltage source switches the liquid crystal cell 10 into an on-state, in which the liquid crystal molecules are aligned generally parallel to the optical axis of the objective lens 12. In the off-state of the liquid crystal cell 10, the polarization of the incident radiation is rotated through 90° when passing through the liquid crystal cell 10. Conversely, in the on-state, the liquid crystal cell 10 has no effect on the polarization of the radiation passing through the cell 10.

The liquid crystal layer in the TN liquid crystal cell 10 is relatively thin, at 4–6 µm. The response speed of the spherical aberration compensation optical subsystem is correspondingly fast, with the cell switching between on and off states within 10–50 ms.

A further component of the spherical aberration compensation optical subsystem is the phase modifying mirror 32, which imparts a predetermined wavefront error compensation phase modification to the beam in dependence on the state of the TN cell 10.

The quarter wavelength retarder plate 14 is interposed between the mirror 32 and the optical disk OD in order to improve the optical efficiency of the device in combination with the polarizing beam splitter 8, by creating a 90° rotation in polarization between the reflected and incident beams at the polarizing beam splitter 8.

Referring now to FIG. 6A which illustrates the TN liquid crystal cell 10 in an off-state, an incident beam, indicated at 104, generated by the radiation source 6, first passes through the polarizing beam splitter 8 with a P-type polarization. On passing through the TN liquid crystal cell 10, the polarization of the incident beam is rotated to an S-type polarization. The folding mirror 32 reflects the beam from its first surface 34. On then passing through the quarter wavelength plate 14, the polarization of the incident beam is modified to a right-handed circular polarization, and the incident beam is reflected from the information layer 3 or 4 being scanned in the optical disk 1. The polarization of the reflected beam is thereby modified to a left-handed circular polarization, which on passing through the quarter wavelength plate 14 is modified to a P-type polarization.

The folding mirror 32 reflects the returning beam from its NPS-patterned second surface 36 and on passing through the off-state TN liquid crystal cell 10 the P-type polarization is modified to an S-type polarization by the 90° rotation effect of the TN cell 10. The polarizing beam splitter 8 reflects the majority of the reflected beam, in its S-type polarization state, towards the detector 23 in the beam indicated at 106.

Referring now to FIG. 6B, the discussion relating to FIG. 6A applies, however, in this case, the TN liquid crystal cell 10 is switched to an on-state by the spherical aberration control signal 30. Thus, the polarization of the radiation incident on the TN liquid crystal cell 10 is unaffected by its passage through the cell 10. Accordingly, the beam when incident upon the folding mirror 32 remains in a P-type polarization state and thus passes through the first surface 34 without reflection and is reflected by the second surface 36, thereby generating a pattern of wavefront correction corresponding to the NPS pattern on the second surface 36. Conversely, when the returning beam is incident upon the mirror 32 the beam is in an S-type polarization state, and is reflected by the first planar surface 34. When the reflected beam meets the polarizing beam splitter 8 the reflected beam is in an S-type polarization, and the polarizing beam splitter 8 reflects the majority of the beam 106 towards the detector systems 23.

Switching the TN liquid crystal cell 10 thus creates a difference in the shape of the wavefront of the beam incident upon the optical disk. The wavefront correction generated in the folding mirror 32 is used to compensate spherical aberrations generated by the passage of the beam through one of, or both of, the transparent layers 2, 5. An improved resolution can thus be obtained at each of the information layers 3, 4 of the disk, even though two different depths of information layer are required to be read by the scanning device, in this example in a dual-layer optical disk.

It will be appreciated that the present invention allows for the reading of, or writing to, an optical disk of high capacity, using a relatively low wavelength radiation beam, for example, a radiation beam of approximately 400 nm wavelength, using a high numerical aperture beam at the optical disk, and without using a mechanical actuator or a birefringent lens to effect spherical aberration compensation, even for varying depths of information layer in the optical disks being read.

While in the embodiments described above, a single radiation source is used and a TN liquid crystal cell is used to selectively rotate the polarization of the incident radiation through 90°, similar (but less optimal in terms of complexity and the efficiency of the optical system) functionality could be provided by dispensing with the polarization rotating element and, instead, using either a single radiation source emitting radiation at an orientation of 45° to the axis of birefringence and/or the beam splitter, or two separate radiation sources emitting orthogonally-polarized radiations at each of the required polarizations. The required spherical aberration compensation can then be selected, in accordance with a selection control signal, for example, by a switchable polarization-selective filter at the detector. Alternatively, in the case of providing two such separate radiation sources, the sources may be selectively energized in accordance with the selection control signal.

Furthermore, in an alternative embodiment, the scanning device may be used to provide wavefront aberration compensation for compatibility with different formats of disk, such as CD and DVD compatibility. The polarization-sensitive first surface may be used to provide selective wavefront aberration compensation between the two beams.

In a further alternative embodiment, the first surface may include a dichroic thin film reflective layer in place of the polarization-selective layer to provide the selectivity between two beams of two different wavelengths, wherein the layer is transparent to one wavelength and reflective to the other wavelength.

In a further embodiment, the selectivity between the two beams at the first surface is angular selectivity. In this embodiment, the two beams approach the first surface at different angles, one beam being transmitted and the other being reflected (for example, due to total internal reflection).

In the above-described embodiments, the wavefront error correction element is integrated with a folding mirror arranged in the main beam path at 45° to the optical axis of the beam. In an alternative embodiment, a wavefront error correcting element, similar to that described, is arranged for a separate beam path leg of the optical scanning device. In this embodiment, the element may be arranged perpendicular to the axis of the beam.

Although the objective lens is indicated in FIG. 5 as having one plano-convex lens element, it may comprise more elements, and other lens types, such as convex—convex or convex-concave lenses may also be used. The objective may also comprise a hologram operating in transmission or reflection, or a grating for coupling radiation out of a waveguide carrying the radiation beam.

The above embodiments are to be understood as illustrative examples of the invention. Further embodiments of the invention are envisaged. It is to be understood that any feature described in relation to one embodiment may also be used in other of the embodiments. Furthermore, equivalents and modifications not described above may also be employed without departing from the scope of the invention, which is defined in the accompanying claims.

The invention claimed is:

1. An optical element for use with a first radiation beam and a second radiation beam, the optical element including:
   a first reflective surface, said first surface being selectively reflective and capable of reflecting said first radiation beam and of transmitting said second radiation beam; and
   a second reflective surface arranged to receive said second radiation beam when transmitted by said first reflective surface, and to reflect said second radiation beam through said first reflective surface,
wherein said second reflective surface is separated from said first reflective surface by a varying spacing, said varying spacing corresponding to a difference in phase profile to be generated between said first and second radiation beams, and said second reflective surface comprises a phase structure in the form of stepped annular zones, the stepped annular zones forming a non-periodic pattern of different heights corresponding to the difference in phase profile to be generated.

2. The optical element as claimed in claim 1, wherein each said stepped annular zone comprises a plane-parallel surface.

3. The optical element as claimed in claim 1, wherein said second reflective surface includes between 5 and 25 stepped annular zones.

4. The optical element as claimed in claim 1, wherein said second reflective surface comprises a non-planar generally continuous surface having a shape corresponding to the difference in phase profile to be generated.

5. The optical element as claimed in claim 1, wherein said first reflective surface is arranged to reflect radiation in a polarization-selective manner.

6. The optical element as claimed in claim 1, wherein said first reflective surface is arranged to reflect radiation in a wavelength-selective manner.

7. The optical element as claimed in claim 1, wherein the profile of the varying spacing between the first and the second reflective surfaces approximates to spherical aberration.

8. The optical element as claimed in claim 1, wherein said second reflective surface has, on a cross-section therethrough along a plane generally parallel to said first reflective surface, a generally elliptical outline.

9. An optical scanning device for scanning an optical record carrier comprising an information layer, the optical scanning device comprising:
   a radiation source for generating a radiation beam;
   an objective lens, located in an optical path between the radiation source and the information layer, for converging a radiation beam to a spot on the information layer; and
   an optical element having
   a first reflective surface, said first reflective surface being selectively reflective and capable of reflecting a first radiation beam and transmitting a second radiation beam, and
   a second reflective surface arranged to receive said second radiation beam when transmitted by said first reflective surface, and to reflect said second radiation beam through said first reflective surface,
wherein said second reflective surface is separated from said first surface by a varying spacing, said varying spacing corresponding to a difference in phase profile to be generated between said first and second radiation beams, and said second reflective surface comprises a phase structure in the form of stepped annular zones, the zones forming a non-periodic pattern of different heights corresponding to the difference in phase profile to be generated.

10. The optical scanning device as claimed in claim 9, wherein the optical scanning device further comprises a collimator lens, the optical element being located between the collimator lens and the objective lens.

11. The optical scanning device as claimed in claim 9, wherein said first reflective surface is arranged to reflect radiation in a polarization-selective manner.

12. An optical scanning device for scanning an optical record carrier comprising an information layer, the optical scanning device comprising:
   a radiation source for generating a radiation beam;
   an objective lens, located in an optical path between the radiation source and the information layer, for converging a radiation beam to a spot on the information layer; and
   an optical element having a first reflective surface, said first reflective surface being selectively reflective and capable of reflecting a first radiation beam and of transmitting a second radiation beam, and being arranged to reflect radiation in a polarization-selective manner, and a second reflective surface arranged to receive said second radiation beam when transmitted by said first reflective surface, and to reflect said second radiation beam through said first reflective surface, said second reflective surface being separated from said first surface by a varying spacing, said varying spacing corresponding to a difference in phase profile to be generated between said first and second radiation beams, and said second reflective surface having a phase structure in the form of stepped annular zones, the stepped annular zones forming a non-periodic pattern of different heights corresponding to the difference in phase profile to be generated, wherein said optical scanning device further comprises an electro-optical element switchable between a first state, in which the polarization of light exiting the electro-optical element has a first orientation relative to a predetermined polarization of light entering the electro-optical element, and a second state, in which the polarization of light exiting the electro-optical element has a second orientation relative to said predetermined polarization, said electro-optical element thereby providing said first and second radiation beams, respectively, with orthogonal polarizations.

13. The optical scanning device as claimed in claim 12, wherein the optical characteristics of the electro-optical element are altered under control of a selection signal selectively indicating one of at least two discrete information layer depths to be scanned.

14. The optical scanning device as claimed in claim 9, wherein the radiation beam emerging from the objective lens is arranged to impinge on the record carrier with a numerical aperture greater than 0.7.

15. The optical scanning device as claimed in claim 9, wherein said first reflective surface is arranged at approximately 45° to an optical axis of the optical scanning device.

16. A method of operating the optical scanning device of claim 9, comprising the steps of:
   reading an information layer of the record carrier during a scanning operation; and
   altering the optical characteristics of the optical scanning device during the scanning operation in order to compensate for a spherical aberration generated in the record carrier.

17. A method of operating the optical scanning device of claim 9, comprising the steps of:
   writing data to an information layer of the record carrier during a scanning operation; and
   altering the optical characteristics of the optical scanning device during the scanning operation in order to compensate for a spherical aberration generated in the record carrier.

* * * * *